(12) United States Patent
Parthasarathy et al.

(10) Patent No.: US 9,705,762 B2
(45) Date of Patent: Jul. 11, 2017

(54) SYSTEMS AND METHODS FOR DETECTING DEVICE IDENTITY AT A PROXY BACKGROUND

(71) Applicant: Citrix Systems, Inc., Fort Lauderdale, FL (US)

(72) Inventors: Kannan Parthasarathy, Palo Alto, CA (US); Nicholas James Stavrakos, Los Altos, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 189 days.

(21) Appl. No.: 14/503,092

(22) Filed: Sep. 30, 2014

(65) Prior Publication Data
US 2016/0094423 A1    Mar. 31, 2016

(51) Int. Cl.
| | |
|---|---|
| G06F 15/16 | (2006.01) |
| H04L 12/26 | (2006.01) |
| H04L 29/06 | (2006.01) |
| H04L 29/12 | (2006.01) |
| H04W 4/02 | (2009.01) |
| H04L 29/08 | (2006.01) |

(52) U.S. Cl.
CPC ........ H04L 43/065 (2013.01); H04L 61/6018 (2013.01); H04L 67/28 (2013.01); H04L 69/16 (2013.01); H04W 4/023 (2013.01)

(58) Field of Classification Search
CPC .... H04L 43/065; H04L 61/6018; H04L 67/28
USPC ....................................................... 709/227
See application file for complete search history.

(56) References Cited

U.S. PATENT DOCUMENTS

| | | | |
|---|---|---|---|
| 8,788,661 B2* | 7/2014 | Raleigh .................. | G06Q 50/06 455/406 |
| 2004/0044781 A1 | 3/2004 | Hymel | |
| 2004/0054786 A1* | 3/2004 | Kjellberg .......... | G06F 17/30905 709/228 |

(Continued)

FOREIGN PATENT DOCUMENTS

WO    WO 2009/149063 A1    12/2009

OTHER PUBLICATIONS

U.S. Appl. No. 14/015,866, filed Aug. 30, 2013.
(Continued)

*Primary Examiner* — Phuoc Nguyen
(74) *Attorney, Agent, or Firm* — Finnegan, Henderson, Farabow, Garrett & Dunner, LLP (57) ABSTRACT

A system and method is provided for determining a client device identity. In one implementation, a method is provided that can include receiving a request from a client device. The method can also include determining, based on the client device request, a subscriber identification. After determining the subscriber identification, the method can include acquiring, from a transactional history database, transactional device data associated with the subscriber identification. In some embodiments, the transactional device data can include one or more counts associated with one or more device types. The method can also include determining, based on the transactional device data, the client device identity. In some embodiments, the determination of the client device identity can include selecting a device type of the one or more device types with the maximum count and setting the client device identity to the selected device type.

24 Claims, 5 Drawing Sheets

(56) References Cited

U.S. PATENT DOCUMENTS

| | | | |
|---|---|---|---|
| 2006/0129638 A1* | 6/2006 | Deakin | H04W 8/22 |
| | | | 709/203 |
| 2008/0140831 A1* | 6/2008 | Kawana | H04L 41/00 |
| | | | 709/224 |
| 2011/0289308 A1* | 11/2011 | Sobko | G06F 21/56 |
| | | | 713/100 |
| 2012/0254042 A1* | 10/2012 | Ludemann | G06Q 20/32 |
| | | | 705/78 |
| 2013/0109358 A1* | 5/2013 | Balasubramaniyan | H04W 24/08 |
| | | | 455/411 |
| 2013/0166634 A1 | 6/2013 | Holland | |
| 2013/0263167 A1 | 10/2013 | Parthasarathy et al. | |
| 2014/0258441 A1* | 9/2014 | L'Heureux | H04W 12/06 |
| | | | 709/217 |
| 2014/0325025 A1* | 10/2014 | Yeleswarapu | H04L 63/02 |
| | | | 709/219 |
| 2015/0149896 A1* | 5/2015 | Radhakrishnan | G06F 17/276 |
| | | | 715/271 |

OTHER PUBLICATIONS

PCT Patent Application US2015/053046 filed Sep. 29, 2015; International Search Report and Written Opinion dated Dec. 1, 2015.

* cited by examiner

SYSTEMS AND METHODS FOR DETECTING DEVICE IDENTITY AT A PROXY

BACKGROUND

BACKGROUND

Proxies are intermediate systems or applications used to improve the end-to-end communication performance of devices connected to a network. Transmission control protocol ("TCP") proxies are a type of proxy that can be used in a variety of settings. For example, TCP proxies can be used in networks to optimize traffic, providing a superior user experience. Additionally, TCP proxies can be used for content filtering and security services.

In many instances where TCP proxies are used, it is beneficial to know the attributes of the client device associated with a specific traffic flow. For example, a traffic management system used to optimize traffic in a cellular mobile carrier network can tune the optimization settings to suit the form factor, screen size, and other capabilities of the client device. Knowing the precise identity of client devices (e.g., manufacturer, model, and operating system version) is useful not only for traffic management systems, but also for reporting systems that provide detailed insight into the makeup of the traffic. The identity of the client device, however, cannot be determined from the information available at the TCP/IP level of the packet flow.

BRIEF DESCRIPTION OF THE DRAWINGS

Reference will now be made to the accompanying drawings showing exemplary embodiments of this disclosure. In the drawings.

DETAILED DESCRIPTION OF THE DRAWINGS

Reference will now be made in detail to the exemplary embodiments consistent with the embodiments disclosed herein, the examples of which are illustrated in the accompanying drawings. Wherever possible, the same reference numbers will be used throughout the drawings to refer to the same or like parts.

As stated above, the identity of the client device cannot be determined from the information available at the TCP/IP level of the packet flow. One approach to detect the identity of the client device is to look at the User Agent header in HTTP requests originating from the client device; the User Agent string typically has enough information to uniquely identify the client device type. This method, however, is limited to only HTTP traffic. Furthermore, many HTTP-based applications that run on smartphones do not use any User Agent string or use a random User Agent string each time; in such cases it is not possible to detect the identity of the client device even for HTTP traffic. Similarly, it is not possible to detect the identity of the device from traffic that does not use the HTTP protocol, including encrypted traffic using the HTTPS protocol.

The present disclosure generally relates to traffic management systems and provides the ability to detect the identity of the client device at a proxy that will work for all TCP/IP traffic, as well as UDP/IP traffic. In particular, the present disclosure relates to optimizing traffic in a network in which client device characteristics, e.g. manufacturer, model, operating system, form factor, screen size, etc., are unknown. Exemplary embodiments relate to methods and systems for determining the identity of a client device in a network.

Figure 1:
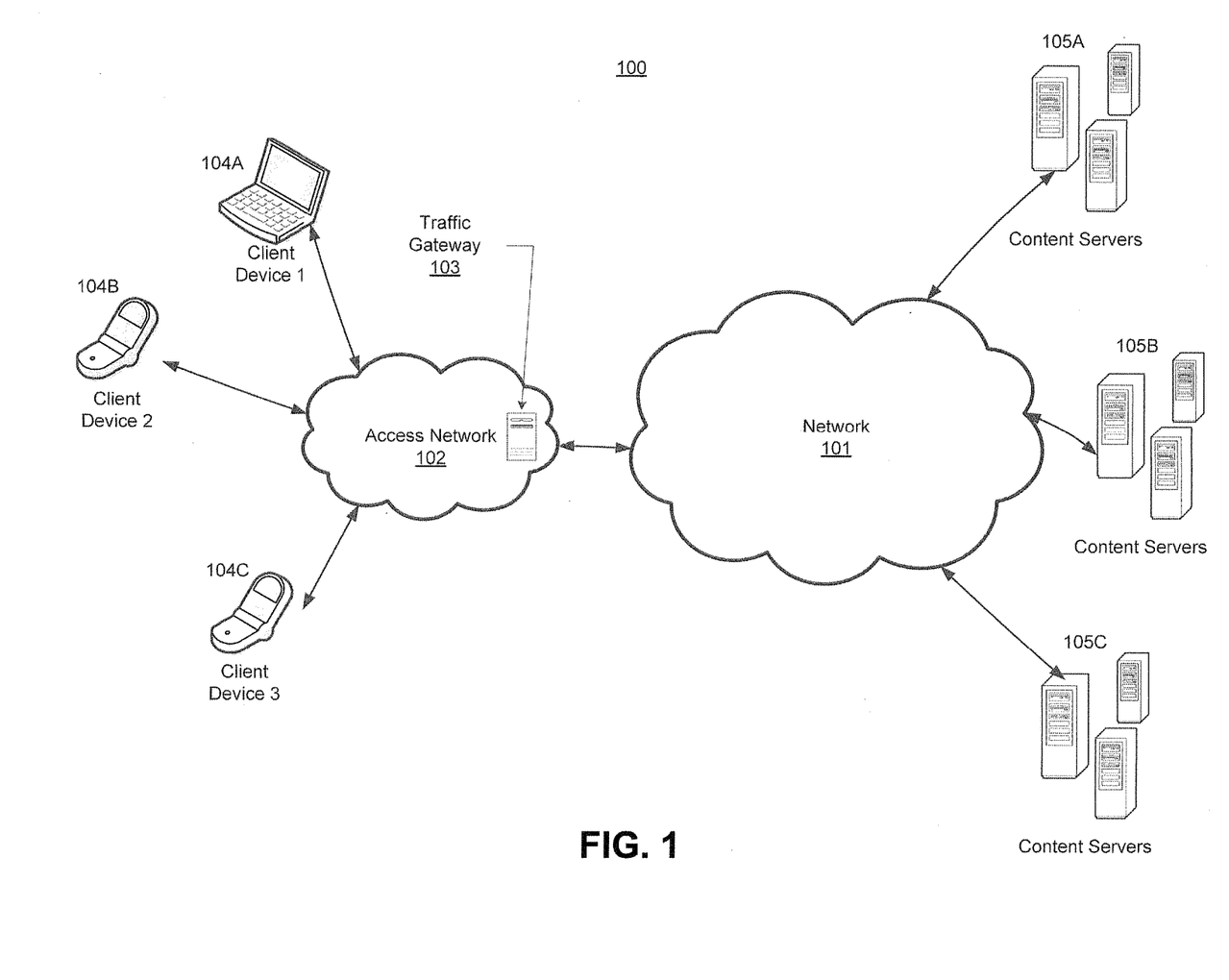
FIG. 1 is a block diagram of an exemplary network system, consistent with embodiments of the present disclosure.

FIG. 1 is a block diagram of an exemplary network system 100. Exemplary communication system 100 can be any type of system that transmits data packets over a network. For example, the exemplary communication system 100 can include one or more networks transmitting data packets across wired or wireless networks from servers to client devices. The exemplary system 100 can include, among other things, network 101, access network 102, traffic gateway 103, one or more client devices 104A-C, and one or more content servers 105A-C.

Network 101 can include any combination of wide area networks (WANs), local area networks (LANs), or wireless networks suitable for packet-type communications. In some exemplary embodiments, network 101 can be, for example, Internet and X.25 networks. Network 101 can communicate data packets with access network 102 and with one or more content servers 105A-C.

Access network 102 can include one or more radio networks, one or more cellular networks, one or more wide area networks (WANs), one or more local area networks (LANs), wireless networks suitable for packet-type communications, or any combination thereof. Access network 102 can be operated by, for example, service providers such as DSL service provides (e.g., AT&T®), broadband service providers (e.g., Comcast®), and numerous cellular service provides (e.g., AT&T®, Sprint®, and Verizon®). Access network 102 can employ technologies including digital subscriber line (DSL), cable broadband, 802.11 Wi-Fi, Global System for Mobile Communication (GSM), Universal Mobile Telecommunications System (UMTS) adopting Wideband Code Division Multiple Access (W-CDMA) radio access technology, CDMA2000, Worldwide Interoperability for Microwave Access (WiMax) and Long Term Evolution (LTE). For example, in some embodiments, access network 102 can be a General Packet Radio Service (GPRS) core network, which provides mobility management, session management and transport for Internet Protocol packet services in GSM and W-CDMA networks. One or more client devices (e.g., 104A-C) can communicate with access network 102, which in turn communicates with one or more content servers 105A-C directly or indirectly through network 101. The exemplary access network 102 can include, among other things, traffic gateway 103.

As shown in FIG. 1, traffic gateway 103 can be deployed at one or more locations within access network 102. Traffic gateway 103, however, is not limited to be located within the access network 102. Rather, it can be implemented at any intermediate nodes within the communication system 100. In some embodiments of access network 102, traffic gateway 103 can be incorporated in a gateway node that has visibility into data traffic between all client devices and content servers. For example, in the case of a mobile broadband access network using GSM or UMTS technology, traffic gateway 103 can be located at any intermediate nodes including Traffic Optimization Platforms (TOP), Deep Packet Inspection (DPI) nodes, and other gateway nodes such as the Gateway GPRS Support Node (GGSN). A TOP can perform web and video compression. A DPI node can examine the header (and possibly also the data part) of a packet as it passes an inspection point, searching for protocol non-compliance, viruses, spam, intrusions, or defined criteria to decide whether the packet may pass or if it needs to be routed to a different destination, or, for the purpose of collecting statistical information. A GGSN can be responsible for the interworking between the GPRS network and external packet switched networks, such as the Internet and X.25 networks.

Traffic gateway 103 is not limited to be located at the above exemplary nodes. In some embodiments, traffic gateway 103 can also be implemented on any one or more gateway nodes that convert formatted data provided in one type of network to a particular format required for another type of network, or any other intermediate nodes if desired. A gateway node, for example, may be a server, a router, a firewall server, a host, or a proxy server. Much like a content server, an HTTP proxy server can accept target URLs within a client's browser window, process the request, and then display the contents of the requested URLs immediately back within the client's browser. In some embodiments, the HTTP proxy servers can be explicit HTTP proxy servers (e.g. Wireless Application Protocol (WAP) Gateways) that process web pages or transparent HTTP proxy servers such as those in traffic management and optimization platforms. A gateway node may be capable of processing webpage, image, audio, video, and T.120 transmissions alone or in any combination, and is capable of full duplex media translations.

Traffic gateway 103 can process any packet type communications including multimedia data, such as audio data, video data, graphical data, or any combination thereof. Multimedia data transmission can be, for example, part of Transport Control Protocol (TCP) transactions. TCP transactions can include TCP requests from one or more client devices 104A-C and TCP responses from one or more content servers 105A-C. As an example, through one or more TCP transactions, a client device (such as client device 104A) can request multimedia data (e.g., a video clip) stored on a content server (e.g., content server 105A), and the content server can respond to the request by transmitting the multimedia data to the client device, which then acknowledges the receipt of the multimedia data. When traffic gateway 103 is deployed on an intermediate node (e.g., a gateway node in access network 102) that is located between the client device and the content server, it can process the multimedia data by, for example, obtaining, measuring, extracting, and storing a variety of transactional events and parameters associated with the multimedia data. It is appreciated that traffic gateway 103 can process multimedia data transmitted by more than one content server and requests transmitted by more than one client device. Traffic gateway 103 will be further described below in detail.

Traffic gateway 103 can have one or more processors and at least one memory for storing program instructions. The processor(s) can be a single or multiple microprocessors, general purpose processors, graphical processors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs and special purpose computers. Traffic gateway 103 can communicate with one or more client devices 104 and one or more client servers 105, either directly or indirectly.

One or more client devices 104A-C can be devices or applications, either in hardware or software, that communicate with access network 102. One or more client devices 104A-C can be, for example, mobile handheld devices, laptop computers, netbook devices, smart phone devices, tablets, smartwatches, web TV equipment, game consoles (e.g., Xbox™ or Playstation™), or any other devices or applications that can communicate with a network. While it is appreciated that that one or more client devices 104A-C can include wired devices, one or more client devices 104A-C are typically wireless devices since the quality of experience for users of wireless devices tends to fluctuate more based on the variation in one or more networks bandwidths and the number of subscribers using those networks. One or more client devices 104A-C can make requests to and receive responses from one or more content servers 105A-C through access network 102 and network 101.

One or more content servers 105A-C can be any computer systems or software programs that are capable of serving the requests of clients, e.g., one or more client devices 104A-C. One or more content servers 105A-C can be any types of servers including content servers, application servers, communication servers, database servers, proxy servers, web servers, caching servers, and any other suitable servers. One or more content servers 105A-C can store and provide, among other things, multimedia data. Any requested multimedia data can be provided by one or more content servers.

Figure 2:
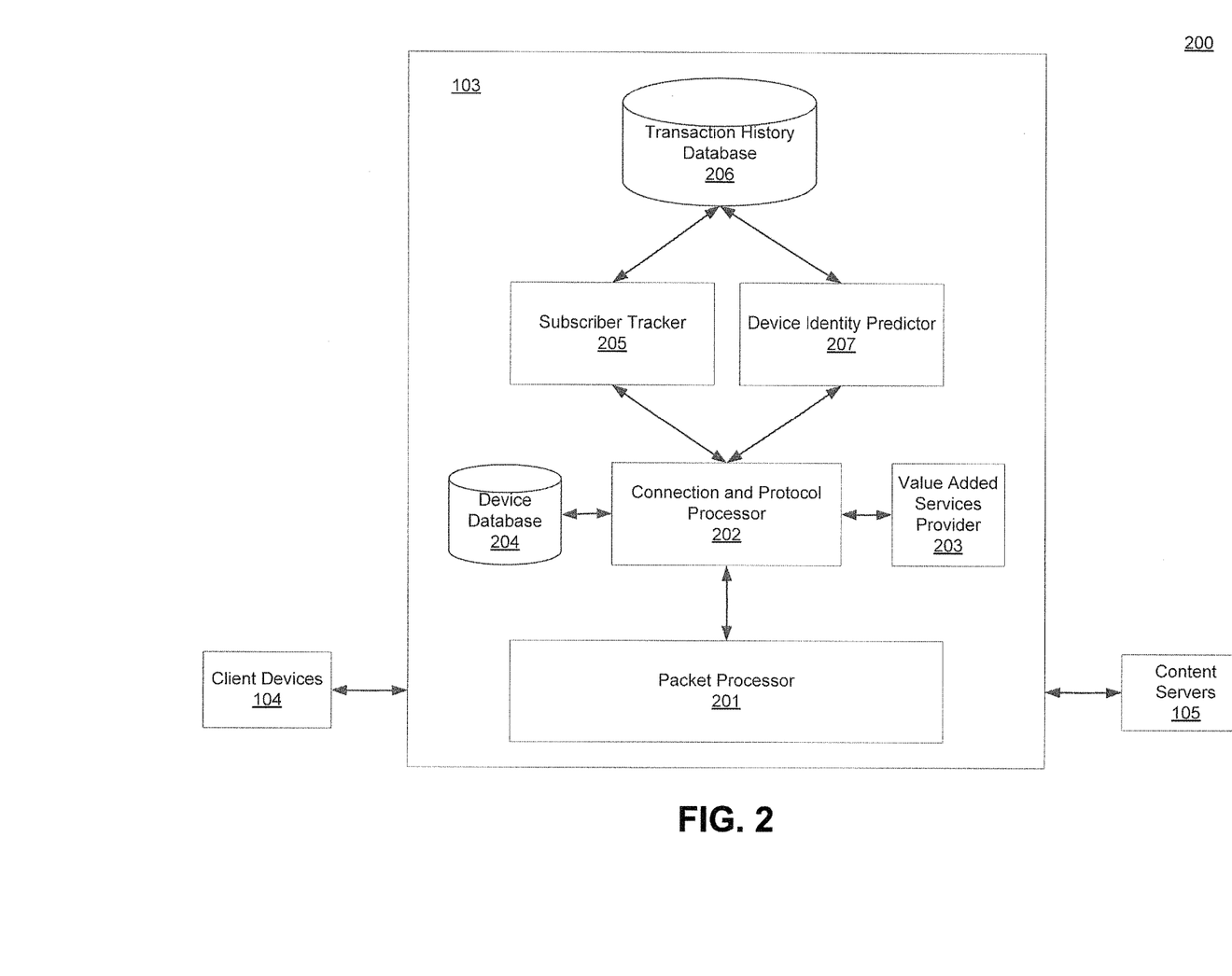
FIG. 2 is a simplified block diagram illustrating an embodiment of an exemplary traffic gateway show in FIG. 1, consistent with embodiments of the present disclosure.

FIG. 2 is a simplified block diagram illustrating an embodiment of an exemplary traffic gateway 103 shown in FIG. 1. Traffic gateway, can include, among other things, a packet processor 201, a connection and protocol processor 202, a value added services provider 203, a device database 204, a subscriber tracker 205, a transaction history database 206, and a device identity predictor 207.

Traffic gateway packet processor 201 can be responsible for routing data traffic and handling data packets between one or more client devices 104 and one or more content servers 105. Packet processor 201 can be a software program and/or a hardware device. Packet processor 201 can provide packets received from client devices 104 and content servers 105 to connection and protocol processor 202.

Connection and protocol processor 202 can assign packets to specific connections or TCP flows based on the source IP address, source port number, destination IP address, and destination port number. In some embodiments, packets can be assigned based on a VLAN ID. Connection and protocol processor 202 can detect the application level protocol, e.g., Hypertext Transfer Protocol, and perform protocol specific processing for each connection or TCP flow. The Hypertext Transfer Protocol (HTTP) is an application protocol for distributed, collaborative, hypermedia information systems. HTTP is the fundamental protocol of data communication for the World Wide Web. HTTP functions as a request-response protocol in a client-server computing model. In an HTTP transaction, a web browser, for example, acts as a client (e.g., client devices 104), while an application running on a computer hosting a web site functions as a server (e.g., content servers 105). The client submits an HTTP request message to the server. The server, which stores content, or provides resources, such as HyperText Markup Language (HTML) files, or performs other functions on behalf of the client, returns a response message to the client. A response from the server contains completion status information about the request and may also contain any content requested by the client in its message body. Both HTTP requests and HTTP responses are part of an HTTP transaction. It would be readily appreciated that the processing performed by connection and protocol processor 202 can be performed by separate modules.

In some embodiments, when the application protocol is HTTP, connection and protocol processor 202 can parse HTTP requests and responses received from packet processor 201. Both the client request and the server response can contain headers. A header defines the operating parameters (i.e., meta-data) of an HTTP transaction. For example, the header may include meta-data indicating the type of client device or the type of user agent (e.g., web browser) on the client device. A header may also include other meta-data describing web pages contents.

A user agent is an application, such as a software application (web browser), that runs on a client device and uses the HTTP protocol. Using a user agent meta-data, the HTTP protocol can identify the application that originated the request at the client. In some embodiments, the user agent header contains enough information to uniquely identify the client device. For example, a user agent header can contain the string "Mozilla/5.0 (Linux; Android 4.2.2; SGH-S970G Build/JDG39)." In this example, the client device would be a Samsung™ phone model SGH-S970G running the Android™ 4.2.2 operating system. In other embodiments the user agent header can be missing or can be a random value, and the client device identity can be unknown.

Connection and protocol processor 202 can interface with value added services provider 203. Value added services provider 203 can perform optimization of traffic passing through traffic gateway 103. For example, value added services provider 203 can be a quality of experience (QoE) measurement system, such as the QoE measurement system described in application Ser. No. 14/015,866 or an adaptive traffic manager, such as the adaptive traffic manager described in application Ser. No. 13/436,658 titled Adaptive Traffic Management in Cellular Wireless Networks," both of which are herein incorporated by reference. Value added services provider 203 can perform optimization of web and multi-media traffic, for example, by encoding the traffic according to an optimal session bitrate. Value added services provider 203 can also provide content filtering, email spam and virus detection, and security related services.

In some embodiments, connection and protocol processor 202 can query device database 204 to determine the identity of the client devices 104. Device database 204 can store entries for device types corresponding to the manufacturer and model of client device, e.g., Samsung™ SGH-S970G or Apple™ iPhone™ 5. In some embodiments, device database can store information corresponding to the operating system, e.g., Android 4.2.2 or user application, e.g., Mozilla/5.0 of the device. Device database 204 can be organized according to the user agent header. For example, connection and protocol processor 202 can query device database 204 with user agent string "Mozilla/5.0 (Linux; Android 4.2.2; SGH-S970G Build/JDG39)," thereby determining that the client device is manufactured by Samsung, is the SGH-S970G model, is operating on Android 4.2.2, and is using Mozilla/5.0. In some embodiments, the user agent string can be missing or can contain a random value and a query to device database 204 can return with no specific device being found. In some embodiments, the device type can correspond to a broad category of devices, e.g., devices running Android™.

Connection and protocol processor 202 can provide a device entry retrieved from device database 204 to subscriber tracker 205. In some embodiments, the device entry can be a specific device identifier, e.g., the string "Samsung™ SGH-S970G." In some embodiments, the specific device identifier can be a unique numerical representation of the device entry. Connection protocol processing module 202 can also provide subscriber tracker 205 with a subscriber identification. A subscriber identification can be any unique representation of client device 104. For example, in the cellular network context, a subscriber identification can be a persistent identifier such as a mobile subscriber ISDN number ("MSISDN"), e.g., (650) 123-4567, or international mobile station equipment identity ("IMEI"). In some embodiments, the subscriber identification can be the source IP address, e.g., 172.16.254.1, of the client device 104. Connection and protocol processor 202 can query device identity predictor 207 to determine the identity of client device 104. Connection and protocol processor 202 can use the device identity to optimize data traffic, e.g., by optimally encoding and/or compressing the data for the client device type. Connection and protocol processor 202 can be a software program and/or a hardware device.

Subscriber tracker 205 can maintain counts of types of devices previously associated with a subscriber identification. Subscriber tracker 205 can retrieve historical data stored in transaction history database 206. If transaction history database 206 contains no entries associated with the subscriber identification, subscriber tracker 205 can create a new entry. Subscriber tracker 205 can store the counts associated with an entry in transaction history database 206. For example, if connection and protocol processor 202 provides subscriber tracker with subscriber identification. e.g., (650) 123-4567, and device entry "Samsung™ SGH-S970G," subscriber tracker 205 can update the count, e.g., 9 to 10, for that device type in transaction history database 206. Subscriber tracker 205 can update the total number of counts, e.g. 109 to 110, associated with the subscriber identification. Subscriber tracker 205 can be a software program and/or a hardware device Transaction history database 206 can store the counts of each device type associated with each subscriber identification. The data stored in transaction history database 206 can be used by device identity predictor 207 to predict the identity of client devices 104. Transaction history database 206 can store and organize the data per subscriber identification. For example, transaction history database 206 can store a count for each device type associated with each subscriber identification in a vector, e.g., {100 10}. In this example, 100 can correspond to the number of times the device associated with the subscriber identification was identified as a Samsung™ Galaxy™ S4 and 10 can correspond to the number of times the device associated with the subscriber identification was an Apple™ iPhone™ 5. Multiple device types can be associated with a single user or subscriber identification when, for example, the user agent string provided by an application on a client device 104 is missing or ambiguous. In other embodiments, multiple users with different device types can share a network connection through home access gateways, WiFi hotspots or tethering to other devices. In these exemplary situations, multiple device types can be associated with a single subscriber identification.

In some embodiments, entries in transaction history database 206 can be persistent. For example, if the MISDN number of a client device 104 is used as the subscriber identification, transaction history database 206 can maintain device type counts even after a connection between client device 104 and traffic gateway 103 terminates. In other embodiments, entries in transaction history database 206 can be deleted when client device 104's data session terminates. For example, transaction history database 206 can delete entries when the packet data protocol (PDP) context of the cellular data is torn down. In embodiments where the IP address of the client device 104 is used as the subscriber identification, transaction history database 206 can delete entries associated with that subscriber identification based on an idle timeout. For example, the counts can be stored only for the current device session. Transaction history database 206 can be a software program and/or a hardware device and can be located local to or remote from traffic gateway 103.

Device identity predictor 207 can predict the device identity, e.g., Samsung™ Galaxy™ S4, of client device 104. Device identity predictor 207 can query the transaction history database using the subscriber identification. For example, device identity predictor 207 can use the MSISDN number, e.g., (650) 123-4567, or the IP address of the client device to look up device type counts. In some embodiments, transaction history database 206 contains no entries for the subscriber identification, and device identity predictor 207 can return that the device type is unknown. In some embodiments, when transaction history database contains counts associated with a subscriber identification, device identity predictor can calculate the total number of counts. Device identity predictor 207 can compare the total number of counts to a threshold, e.g., to determine whether sufficient historical data exists to make an accurate prediction of the identity of the client device 104. If the total number of counts does not exceed the threshold, device identity predictor can return that the device type is unknown.

Device identity predictor 207 can determine the device type associated with the subscriber identification with the maximum count. For example, if transaction history database 206 contains the counts of 900 and 100 for the Samsung™ Galaxy™ S4 and Apple™ iPhone™ 5, respective, device identity module can select the Samsung™ Galaxy™ S4. In some embodiments, device identity predictor 207 can normalize the maximum device type count by dividing the count by the total number of counts. The normalized maximum count can be expressed as a percentage, fraction, or numerical value. In the example above, the normalized maximum count would be 0.9 or 90%. Device identity predictor 207 can predict the identity of client device 104 by comparing the normalized maximum count to a second threshold, e.g., 80%. If the normalized maximum count is less than or equal to the second threshold, device identity predictor 207 can return that the device type is unknown. If the normalized maximum count is greater than the second threshold, device identity predictor 207 can return the device type, e.g., Samsung™ Galaxy™ S4, associated with the maximum device count as the device identity. Device identity predictor 207 can be a software program and/or a hardware device.

Figure 3:
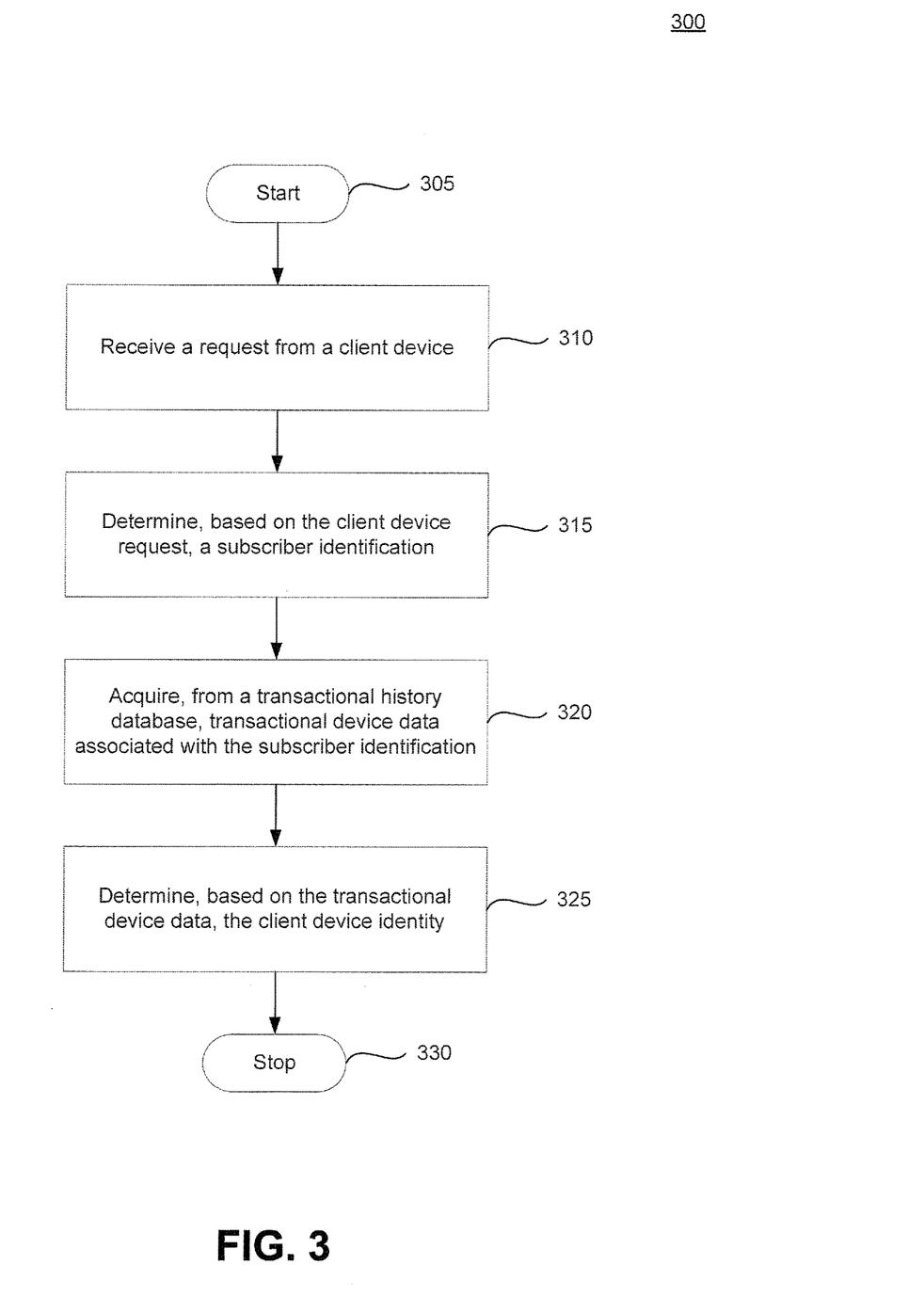
FIG. 3 is a flowchart representing an exemplary method for determining an identity of a client device, consistent with embodiments of the present disclosure.

FIG. 3 is a flowchart representing an exemplary method of determining client device identity. Referring to FIG. 3, it will be readily appreciated that the illustrated procedure can be altered to delete steps or further include additional steps. The method can be performed by a traffic gateway (e.g., traffic gateway 103).

After initial step 305, a TCP proxy (e.g., traffic gateway 103) can receive (310) a request from a client device. In some embodiments, the request can be an HTTP request. The HTTP request can contain a header that can be parsed to determine a user agent. In some embodiments, the user agent can be used to query a device database, e.g., device database 204. The device database can be used to update a transaction history database, e.g., transaction history database 206, as described in greater detail below with respect to FIG. 4.

At step 315, a subscriber identification can be determined based on the client device request. A subscriber identification can be any unique representation of the client device. For example, in the cellular network context, a subscriber identification can be a persistent identifier such as a mobile subscriber ISDN number ("MSISDN"), e.g., (650) 123-4567, or international mobile station equipment identity ("IMEI"). In some embodiments, the subscriber identification can be the source IP address, e.g., 172.16.254.1, of the client device. The subscriber identification can be used to query a transactional history database, e.g., transaction history database 206, for transactional history data associated with the subscriber identification.

At step 320, transactional device data, e.g., counts, associated with the subscriber identification can be acquired from a transaction history database, e.g., transaction history database 206. The transaction history database can store the counts of each device type associated with each subscriber identification. The data stored in the transaction history database can be used by a device identity predictor (e.g., device identity predictor 207) to predict the identity of client devices providing requests. The transaction history database can store and organize the data per subscriber identification. For example, the transaction history database can store a count for each device type associated with each subscriber identification in a vector, e.g., {100 10}. In this example, 100 can correspond to the number of times the device associated with the subscriber identification was identified as a Samsung™ Galaxy™ S4 and 10 can correspond to the number of times the device associated with the subscriber identification was an Apple™ iPhone™ 5. Multiple device types can be associated with a single user or subscriber identification when, for example, the user agent string provided by an application on the client device is missing or ambiguous.

In other embodiments, multiple users with different device types can share a network connection through home access gateways, WiFi hotspots or tethering to other devices. In these exemplary situations, multiple device types can be associated with a single subscriber identification. In some embodiments, the device identity predictor can query the transaction history database using the subscriber identification. For example, device identity predictor can use the MSISDN number, e.g., (650) 123-4567, or the IP address of the client device to look up device type counts. The transaction history database can store counts for a device session. For example, transaction history database 206 can delete entries associated with that subscriber identification based on an idle timeout, indicating that the current session has ended.

At step 325, the client device identity can be determined based on the transactional device data acquired from the transaction history database. If the transaction history database contains no entries for the subscriber identification, and thus no transactional device data is acquired from the transaction history database, the device type identity can be set as unknown. If the transaction history database contains transactional history data associated with a subscriber identification, e.g., subscriber data was found, the device identity predictor can calculate the total number of counts. In some embodiments, the device identity predictor can compare the total number of counts to a threshold, e.g. 1000, to determine whether sufficient historical data exists to make an accurate prediction of the identity of the client device. If the total number of counts does not exceed the threshold, the device type identity can be set as unknown.

If the total transaction count exceeds the first threshold, device identity predictor 207 can determine the device entry associated with the subscriber identification with the maximum count. For example, if transaction history database 206 contains the counts of 900 and 100 for the Samsung™ Galaxy™ S4 and Apple™ iPhone™ 5, respectively, device identity module can select the Samsung™ Galaxy™ S4. In some embodiments, device identity predictor 207 can normalize the maximum device type count by dividing the count by the total number of counts. The normalized maximum count can be expressed as a percentage, fraction, or numerical value. In the example above, the normalized maximum count would be 0.9 or 90%. In some embodiments, device identity predictor 207 can predict the identity of client device 104 by comparing the normalized maximum count to a second threshold, e.g., 80%. If the normalized maximum count is less than or equal to the second threshold, device type identity can be set as unknown. If the normalized maximum count is greater than the second threshold, device identity predictor 207 can set device type as the entry in the transaction history database, e.g., Samsung™ Galaxy™ S4, associated with the maximum device count (540).

Figure 4:
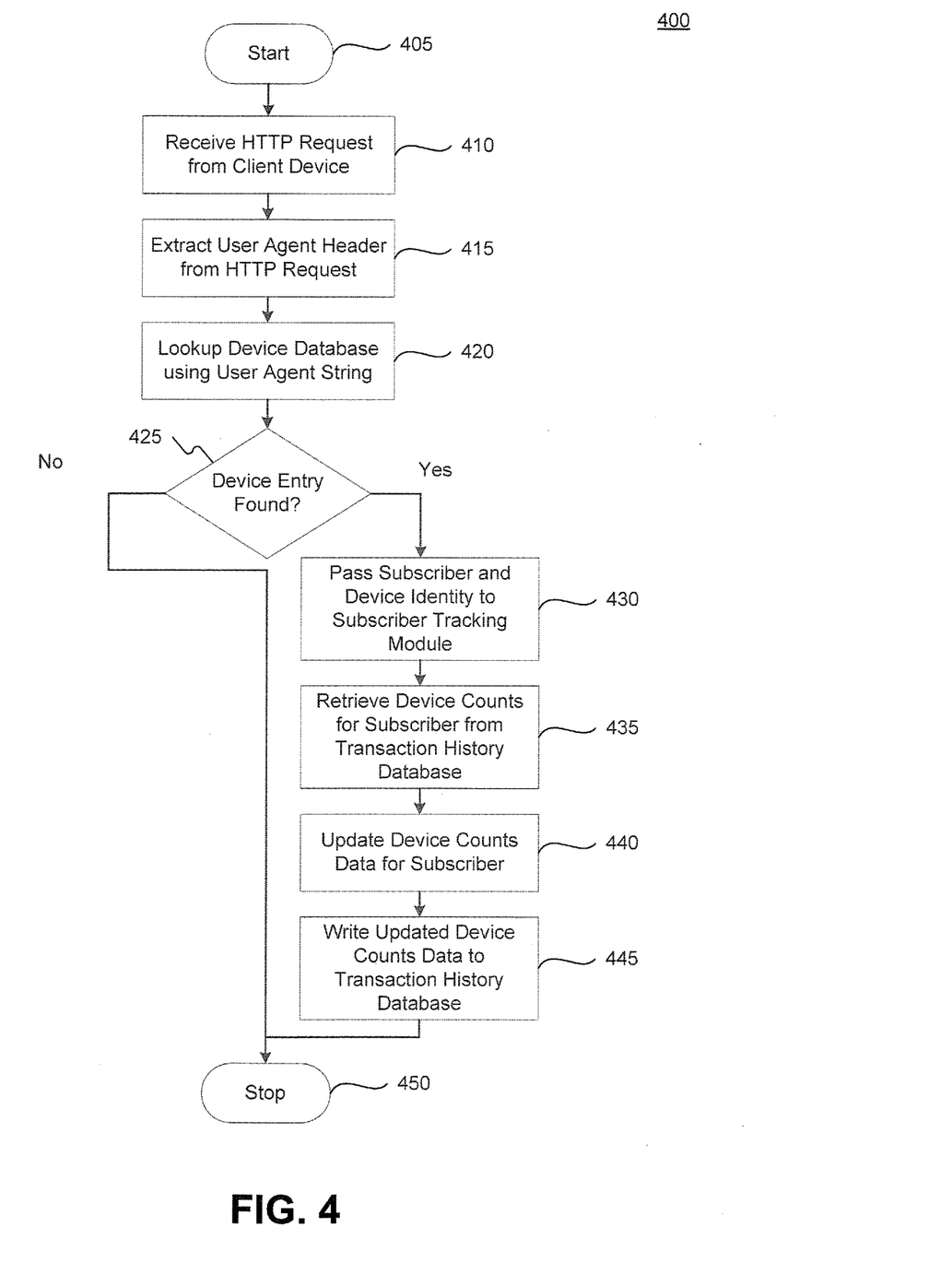
FIG. 4 is a flowchart representing an exemplary method for updating a transaction history database, consistent with embodiments of the present disclosure.

FIG. 4 is a flowchart representing an exemplary method for updating a transaction history database. Referring to FIG. 4, it will be readily appreciated that the illustrated procedure can be altered to delete steps or further include additional steps. The method can be performed by a traffic gateway (e.g., traffic gateway 103).

After initial start step 405, an HTTP request can be received (410) from a client device, e.g., client device 104. Connection and protocol processor 203 can extract (415) a user agent header from the HTTP request, e.g., by parsing HTTP request. A user agent is an application, such as a software application, on the client and uses the HTTP protocol to communicate in a client-server system. A client device using the HTTP protocol can identify the application that originated the request at the client using a user agent's meta data. In some embodiments, the user agent header contains enough information to uniquely identify the client device. For example, a user agent header can contain the string "Mozilla/5.0 (Linux; Android 4.2.2; SGH-S970G Build/JDG39)." In this example, the client device would be a Samsung™ phone model SGH-S970G running the Android™ 4.2.2 operating system. In other embodiments the user agent header can be missing or can be a random value, and the client device identity can be unknown.

At step 420, the user agent can be used to lookup a corresponding entry in a device database, e.g., device database 204. Device database 204 can store entries for device types corresponding to the manufacturer and model of client device, e.g., Samsung™ SGH-S970G or Apple™ iPhone™ 5. In some embodiments, device database can store information corresponding to the operating system, e.g., Android 4.2.2 or user application, e.g., Mozilla/5.0 of the device. Device database 204 can be organized according to the user agent header. For example, connection and protocol processor 202 can query device database 204 with user agent string "Mozilla/5.0 (Linux; Android 4.2.2; SGH-S970G Build/JDG39)," thereby determining that the client device is manufactured by Samsung, is the SGH-S970G model, is operating on Android 4.2.2, and is using Mozilla/5.0. In some embodiments, the device type can correspond to a broad category of devices, e.g., devices running Android™. In some embodiments, the user agent string can be missing or can contain a random value and a query to device database 204 can return with no specific device being found. If no device is found (425), the method ends (450).

If a device entry is found in the device database, the connection and protocol processor can pass (430) the device entry retrieved from the device database to the subscriber tracker 205. In some embodiments, the device entry can be a specific device identifier, e.g., the string "Samsung™ SGH-S970G." In some embodiments, the specific device identifier can be a unique numerical representation of the device entry. The connection and protocol processor can also provide the subscriber tracker with a subscriber identification. A subscriber identification can be any unique representation of a client device. For example, in the cellular network context, a subscriber identification can be a persistent identifier such as a mobile subscriber ISDN number ("MSISDN"), e.g., (650) 123-4567, or international mobile station equipment identity ("IMEI"). In some embodiments, the subscriber identification can be the source IP address, e.g., 172.16.254.1, of the client device 104.

At step 435, the subscriber tracker can retrieve device counts associated with a subscriber identification from a transaction history database, e.g., transaction history database 206. The transaction history database can store the counts of each device type associated with each subscriber identification. The transaction history database can store and organize the data per subscriber identification. For example, the transaction history database can store a count for each device type associated with each subscriber identification in a vector, e.g., {100 10}. In this example, 100 can correspond to the number of times the device associated with the subscriber identification was identified as a Samsung™ Galaxy™ S4 and 10 can correspond to the number of times the device associated with the subscriber identification was an Apple™ iPhone™ 5. Multiple device types can be associated with a single user or subscriber identification when, for example, the user agent string provided by an application on a client device is missing or ambiguous. In other embodiments, multiple users with different device types can share a network connection through home access gateways, WiFi hotspots or tethering to other devices. In these exemplary situations, multiple device types can be associated with a single subscriber identification.

At step 440, the subscriber tracker can update counts associated with the subscriber identification. For example, if the connection and protocol processor provides the subscriber tracker with a subscriber identification. e.g., (650) 123-4567, and device entry "Samsung™ SGH-S970G," subscriber can update the count, e.g., 9 to 10, for that device type. At step 445, the subscriber tracker can write the updated device counts to the transaction history database.

Figure 5:
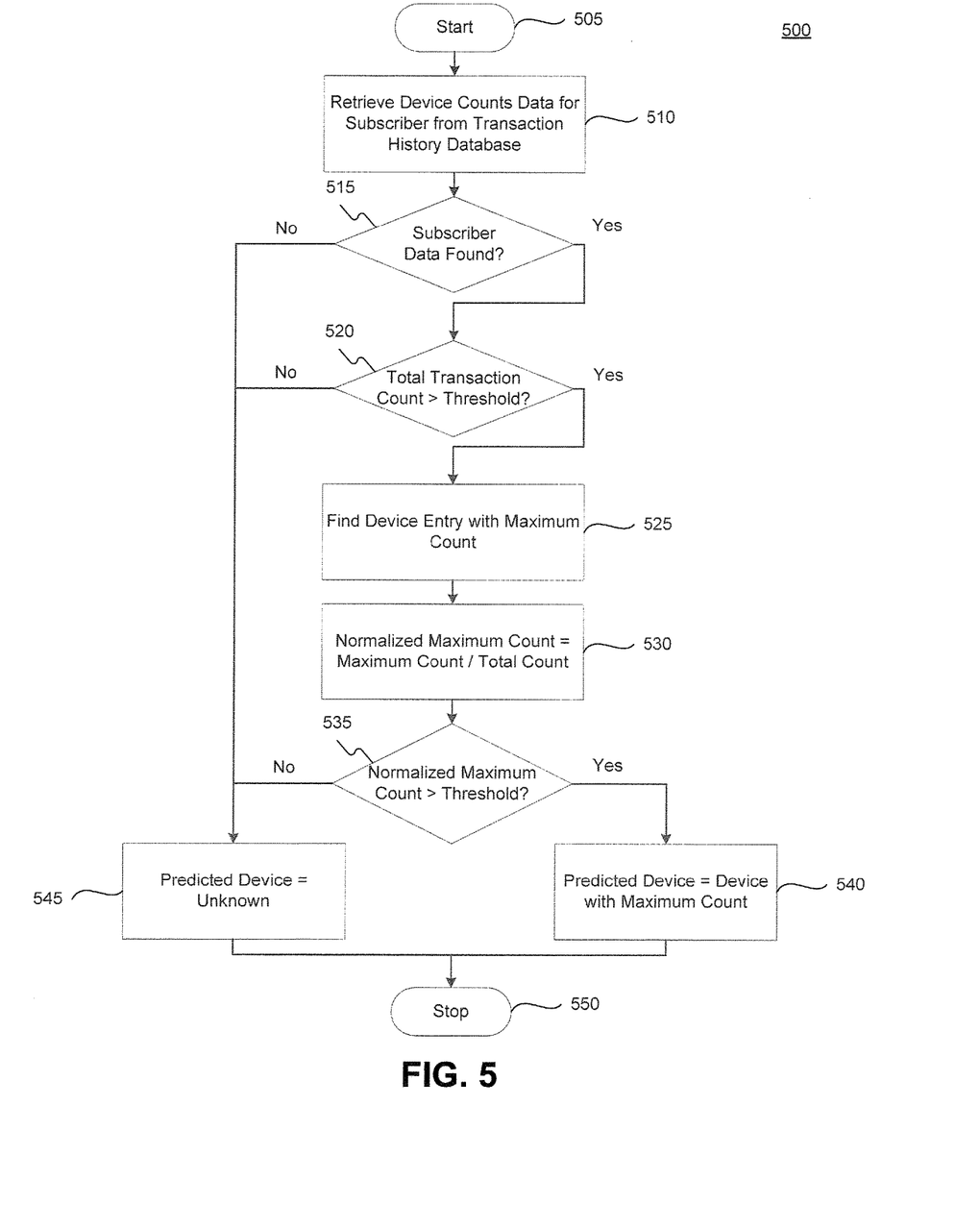
FIG. 5 is a flowchart representing an exemplary method for predicting a client device identity, consistent with embodiments of the present disclosure.

FIG. 5 is a flowchart representing an exemplary method for predicting a client device identity. Referring to FIG. 5, it will be readily appreciated that the illustrated procedure can be altered to delete steps or further include additional steps. The method can be performed by a traffic gateway (e.g., traffic gateway 103).

After initial start step 505, the traffic gateway can retrieve (510) device counts, e.g. transaction history data for a subscriber, from a transaction history database (e.g., transaction history database 206). Device counts can be retrieved by querying the transaction history database using the subscriber identification. For example, the device identity predictor can use the MSISDN number, e.g., (650) 123-4567, or the IP address of the client device to look up device type counts. At step 515, the device identity predictor can determine if subscriber data, e.g., transactional history data associated with the subscriber identification was found. If transaction history database contains no transactional history data associated with the subscriber identification, e.g., no subscriber data was found, the predicted device type can be set to unknown (545). If the transaction history database contains transactional history data associated with a subscriber identification, e.g., subscriber data was found, the device identity predictor can calculate the total number of counts. The device identity predictor can compare the total number of counts to a threshold (520), e.g. 1000, to determine whether sufficient historical data exists to make an accurate prediction of the identity of the client device. If the total number of counts does not exceed the threshold, the predicted device type can be set to unknown (545).

If the total transaction count exceeds the first threshold, the device identity predictor can determine the device entry associated with the subscriber identification with the maximum count. For example, if the transaction history database contains the counts of 900 and 100 for the Samsung™ Galaxy™ S4 and Apple™ iPhone™ 5, respectively, device identity module can select the Samsung™ Galaxy™ S4. In some embodiments, the device identity predictor can normalize (530) the maximum device type count by dividing the count by the total number of counts. The normalized maximum count can be expressed as a percentage, fraction, or numerical value. In the example above, the normalized maximum count would be 0.9 or 90%. After step 530, the device identity predictor can predict the identity of the client device by comparing (535) the normalized maximum count to a second threshold, e.g., 80%. If the normalized maximum count is less than or equal to the second threshold, the predicted device type can be set to unknown (545). If the normalized maximum count is greater than the second threshold, the device identity predictor can set the predicted device as the device type, e.g., Samsung™ Galaxy™ S4, associated with the maximum device count (540).

The methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

In the preceding specification, the subject matter has been described with reference to specific exemplary embodiments. It will, however, be evident that various modifications and changes may be made without departing from the broader spirit and scope of the invention as set forth in the claims that follow. The specification and drawings are accordingly to be regarded as illustrative rather than restrictive. Other embodiments may be apparent to those skilled in the art from consideration of the specification and practice of the embodiments disclosed herein.

What is claimed:

1. A proxy server for determining a client device identity, the proxy server comprising:
    a connection and protocol processor configured to determine a subscriber identification based on a receipt of a request from a client device;
    a transaction history database containing transactional device data; and
    a device identity predictor configured to:
        acquire, from the transaction history database, transactional device data associated with the subscriber identification, wherein the acquired transactional device data includes one or more counts associated with one or more device types;
        determine, based on the one or more counts, a first value associated with a first device type of the one or more device types;
        responsive to a determination that the first value exceeds a first threshold, determine the client device identity as the first device type.

2. The proxy server of claim 1, wherein the
    the first value is determined based on a summation of the one or more counts.

3. The proxy server of claim 1, wherein the device identity predictor is further configured to:
    determine a second value based on a maximum count of the one or more counts;
    normalize the second value; and
    responsive to a determination that the normalized second value is greater than a second threshold, determine the client device identity as the first device type.

4. The proxy server of claim 1, wherein the subscriber identification is one of:
    a mobile subscriber ISDN number;
    an international mobile station equipment identity; or
    an IP address.

5. The proxy server of claim 1, wherein the connection and protocol processor is further configured to:
    extract a user agent string from the client device request;
    query a device database with the user agent string; and
    if a device entry in the device database matches the user agent string, set the client device identity to the device entry.

6. The proxy server of claim 5, further comprising a subscriber tracker configured to acquire, from the transaction history database, a count associated with the subscriber identification and the device entry and to update the count.

7. The proxy server of claim 1, wherein the proxy server is a transmission control protocol (TCP) proxy server.

8. The proxy server of claim 1, wherein the connection and protocol processor is further configured to process, based on the client device identity, response data associated with the request.

9. A method for determining a client device identity, the method comprising:
    receiving, at a proxy server, a request from a client device;
    determining, based on the client device request, a subscriber identification;
    acquiring, from a transactional history database, transactional device data associated with the subscriber identification, wherein the transactional device data includes one or more counts associated with one or more device types;

determining, based on the one or more counts, a first value associated with a first device type of the one or more device types;

responsive to determining that the first value exceeds a first threshold, determining the client device identity as the first device type.

10. The method of claim 9, wherein the first value is determined by summing the one or more counts.

11. The method of claim 9, further comprising:
determining a second value based on a maximum count of the one or more counts;
normalizing the second value; and
responsive to determining that the normalized second value is greater than a second threshold, determining the client device identity as the first device type.

12. The method of claim 9, wherein the subscriber identification is one of:
a mobile subscriber ISDN number;
an international mobile station equipment identity; or
an IP address.

13. The method of claim 9, further comprising:
extracting a user agent string from the client device request;
querying a device database with the user agent string; and
if a device entry in the device database matches the user agent string, setting the client device identity to the device entry.

14. The method of claim 13, further comprising:
acquiring, from the transaction history database, a count associated with the subscriber identification and the device entry; and
updating the count.

15. The method of claim 9, wherein the proxy server is a transmission control protocol (TCP) proxy server.

16. The method of claim 9, further comprising processing, based on the client device identity, response data associated with the request.

17. A non-transitory computer readable storage medium storing instructions that, when executed by a proxy server, cause the server to perform a method for determining a client device identity, the method comprising:
receiving a request from a client device;
determining, based on the client device request, a subscriber identification;
acquiring, from a transactional history database, transactional device data associated with the subscriber identification, wherein the transactional device data includes one or more counts associated with one or more device types;
determining, based on the one or more counts, a first value associated with a first device type of the one or more device types;
responsive to determining that the first value exceeds a first threshold, determining the client device identity as the first device type.

18. The non-transitory computer readable medium of claim 17, wherein the first value is determined by summing the one or more counts.

19. The non-transitory computer readable medium of claim 17, wherein the set of instructions that is executable by the at least one processor of the proxy server to cause the proxy server to further perform:
determining a maximum count of the one or more counts;
normalizing the maximum count; and
if the normalized maximum count is greater than a second threshold, setting the client device identity to the selected device type.

20. The non-transitory computer readable medium of claim 17, wherein the subscriber identification is one of:
a mobile subscriber ISDN number;
an international mobile station equipment identity; or
an IP address.

21. The non-transitory computer readable medium of claim 17, wherein the method further comprises:
extracting a user agent string from the client device request;
querying a device database with the user agent string; and
if a device entry in the device database matches the user agent string, setting the client device identity to the device entry.

22. The non-transitory computer readable medium of claim 17, wherein the method further comprises:
acquiring, from the transaction history database, a count associated with the subscriber identification and the device entry; and
updating the count.

23. The non-transitory computer readable medium of claim 17, wherein the proxy server is a transmission control protocol (TCP) proxy server.

24. The non-transitory computer readable medium of claim 17, wherein the method further comprises processing, based on the client device identity, response data associated with the request.

* * * * *